United States Patent
McGrew

(10) Patent No.: US 7,410,334 B2
(45) Date of Patent: Aug. 12, 2008

(54) RATCHETING WINCH TOOL

(76) Inventor: David L. McGrew, 731 Oakmont Trail, Richmond, KY (US) 40475

( * ) Notice: Subject to any disclaimer, the term of this patent is extended or adjusted under 35 U.S.C. 154(b) by 220 days.

(21) Appl. No.: 11/378,249

(22) Filed: Mar. 20, 2006

(65) Prior Publication Data
US 2007/0217884 A1  Sep. 20, 2007

(51) Int. Cl.
*B65D 63/18* (2006.01)
(52) U.S. Cl. ...................................... 410/100
(58) Field of Classification Search ............... 410/100, 410/103, 101, 106, 12, 96, 97, 156; 16/110.1, 16/114.1; 254/223, 243, 247, 323; 24/68 CD, 24/265 CD; 248/499
See application file for complete search history.

(56) References Cited

U.S. PATENT DOCUMENTS

| 3,255,647 | A | 6/1966 | Gray | |
|---|---|---|---|---|
| 6,102,637 | A | 8/2000 | Mocci | |
| 6,398,470 | B1 | 6/2002 | Mosley | |
| 6,659,697 | B1 | 12/2003 | Guenther | |
| 6,719,507 | B2 * | 4/2004 | Botelho | 410/100 |
| 6,824,339 | B1 | 11/2004 | Childers | |
| 7,278,808 | B1 * | 10/2007 | Sisk et al. | 410/156 |
| 2003/0082022 | A1 * | 5/2003 | Botelho | 410/100 |
| 2005/0284269 | A1 | 12/2005 | Hung | |

* cited by examiner

*Primary Examiner*—H Gutman
(74) *Attorney, Agent, or Firm*—Richard C. Litman

(57) ABSTRACT

A tool adapted to tighten tie-down straps utilized to secure cargo transported on flatbed trailers or the like. The tool includes an elongate handle having a standard ratchet mechanism fixed at one end thereof. A cylindrical socket extends from one side of the ratchet mechanism. The cylindrical socket is designed to encompass a conventional winch drive shaft. Diametrically spaced openings are formed in the circumferential wall of the socket for receiving a locking pin therethrough. The cylindrical socket could be configured internally, at least, to match the winch drive shaft with which it will be used, e.g., square, hexagonal, etc.

12 Claims, 3 Drawing Sheets

RATCHETING WINCH TOOL

BACKGROUND OF THE INVENTION

1. Field of the Invention

The present invention generally relates to hand tools. More specifically, the present invention is drawn to a ratchet wrench employed to tighten tie-down straps that secure cargo on flat bed trailers and the like.

2. Description of the Related Art

It is conventional in the hauling and transporting industry to utilize straps (usually fabricated from nylon) to tie down cargo being transported on flat bed trucks or similar vehicles. Typically, one end of the strap(s) is secured in place on one side of the truck bed. The strap is then disposed over the cargo and the opposite end of the strap is inserted into a winch located on the opposite side of the truck bed. The winch is then rotated in a direction to tighten the strap and secure the cargo. This procedure is followed for each strap used in the arrangement. A bar is employed to rotate the winch. The bar is inserted in the winch and is manually rotated until the straps are tight. This manual rotation is a very inefficient means for tightening the straps. The art would certainly welcome an efficient device that would effectively automate the rotation of the winch.

The related art abounds with devices for rotating tie-down strap winches. Pertinent samples of such devices are cited and identified in the accompanying IDS. However, none of the cited and identified devices, taken either singly or in combination, is seen to disclose a ratcheting winch tool as will subsequently be described and claimed in the instant invention. Thus, a ratcheting winch tool solving the aforementioned problems is desired.

SUMMARY OF THE INVENTION

The present invention to be dubbed the "WINCH-ET" is a tool adapted to tighten tie-down straps, which straps are utilized to secure cargo transported on flatbed trailers or the like. The tool includes an elongate handle having a standard ratchet mechanism fixed at one end thereof. A cylindrical socket extends from one side of the ratchet mechanism. The cylindrical socket is designed to encompass a conventional winch drive shaft. Diametrically spaced openings are formed in the circumferential wall of the socket for receiving a locking pin therethrough.

Accordingly, the instant invention presents a tool that permits a user to tighten tie-down straps efficiently and with a minimum of effort. The invention provides for improved elements thereof in an arrangement for the purposes described that are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
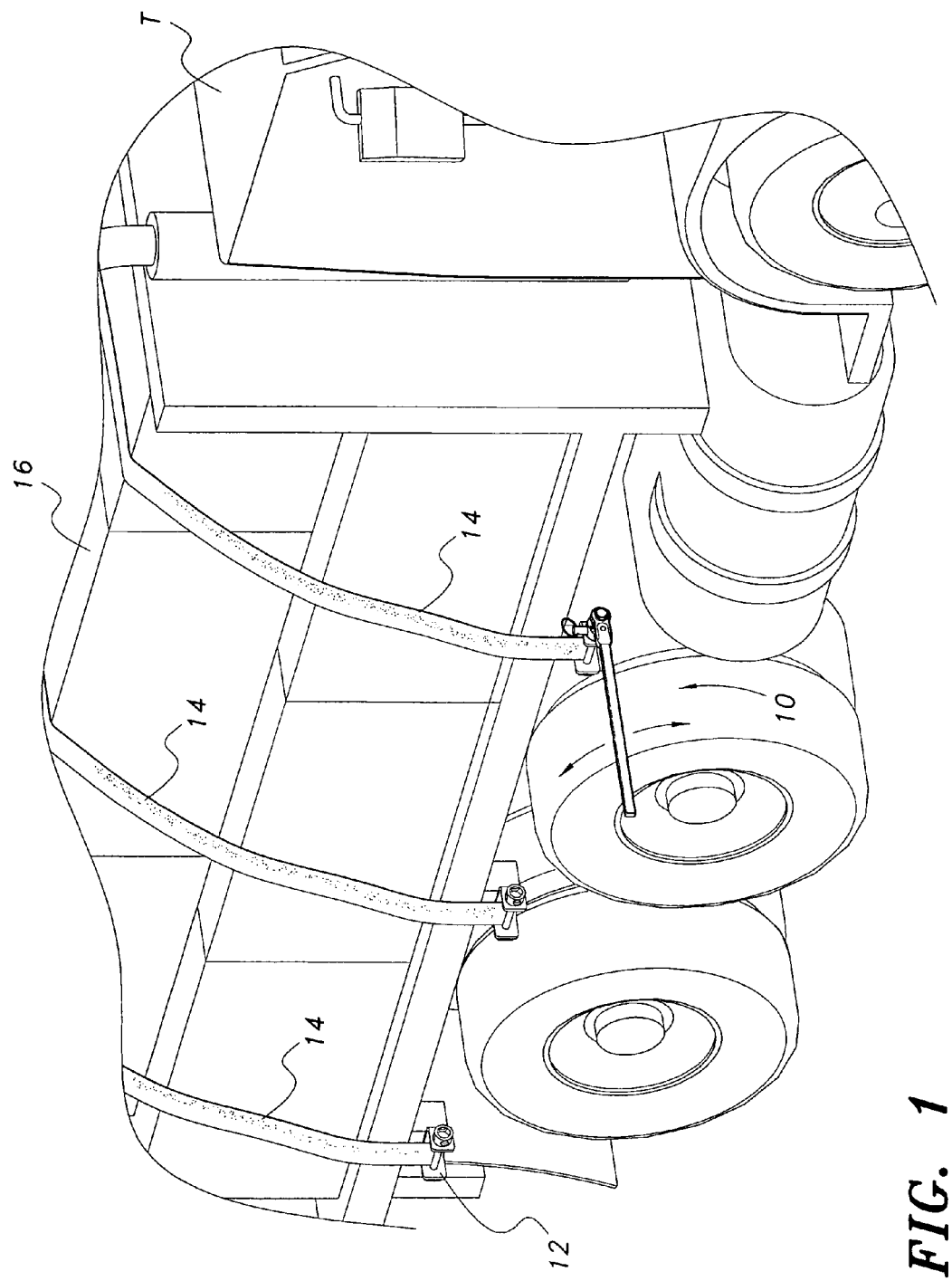
FIG. 1 is an environmental, perspective view of a ratcheting winch tool according to the present invention.

Attention is first directed to FIG. 1 wherein the tool of the present invention is generally indicated at 10. As illustrated, tool 10 is mounted on a winch 12 to tighten a strap 14, which strap functions to secure cargo 16 disposed on a flat bed truck T. As indicated above, tool 10 would be successively mounted on each of the winches 12 to tighten each strap.

Figure 2:
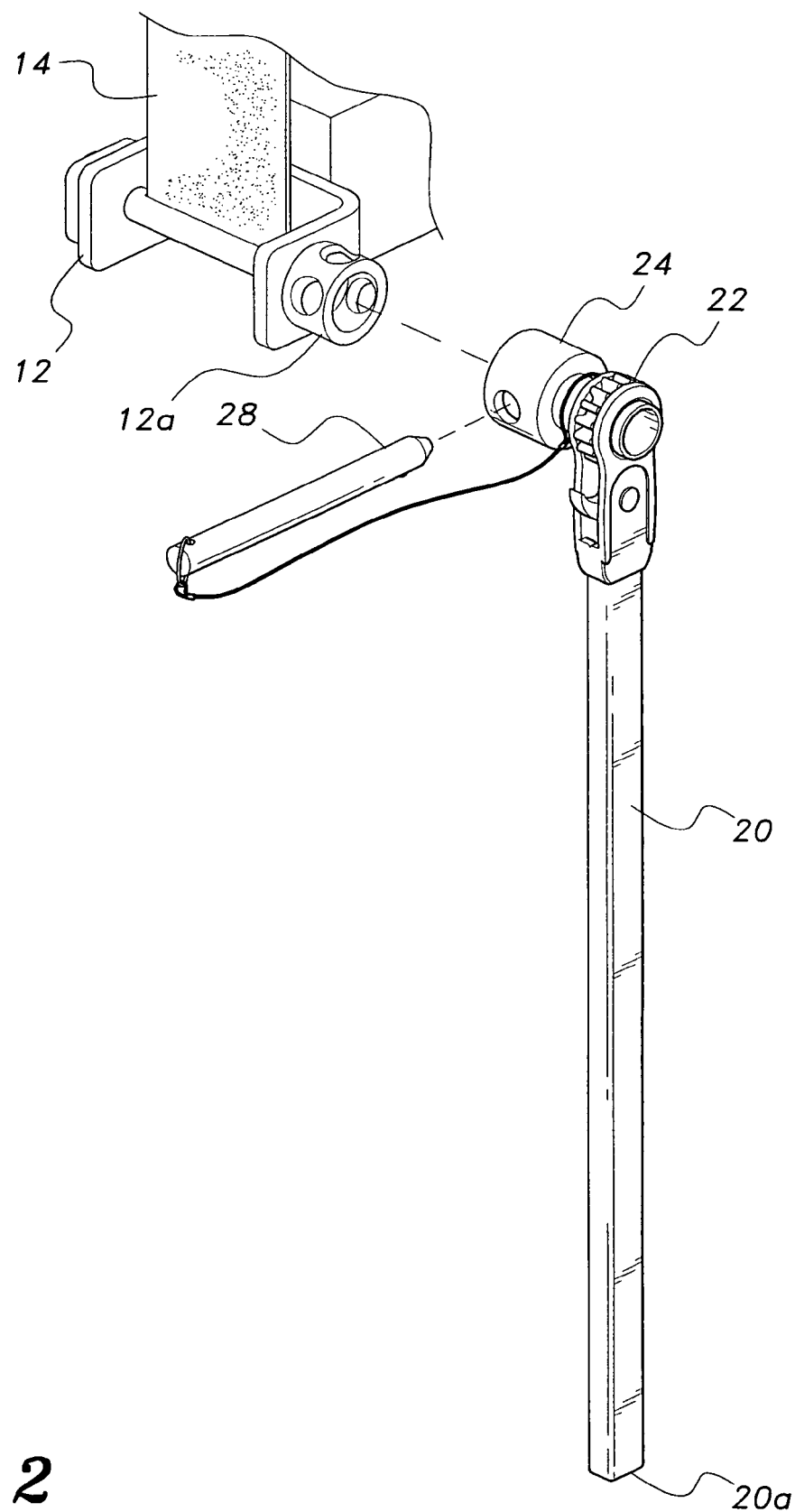
FIG. 2 is a perspective view of a ratcheting winch tool inserted on a winch core according to the present invention.
Figure 3:
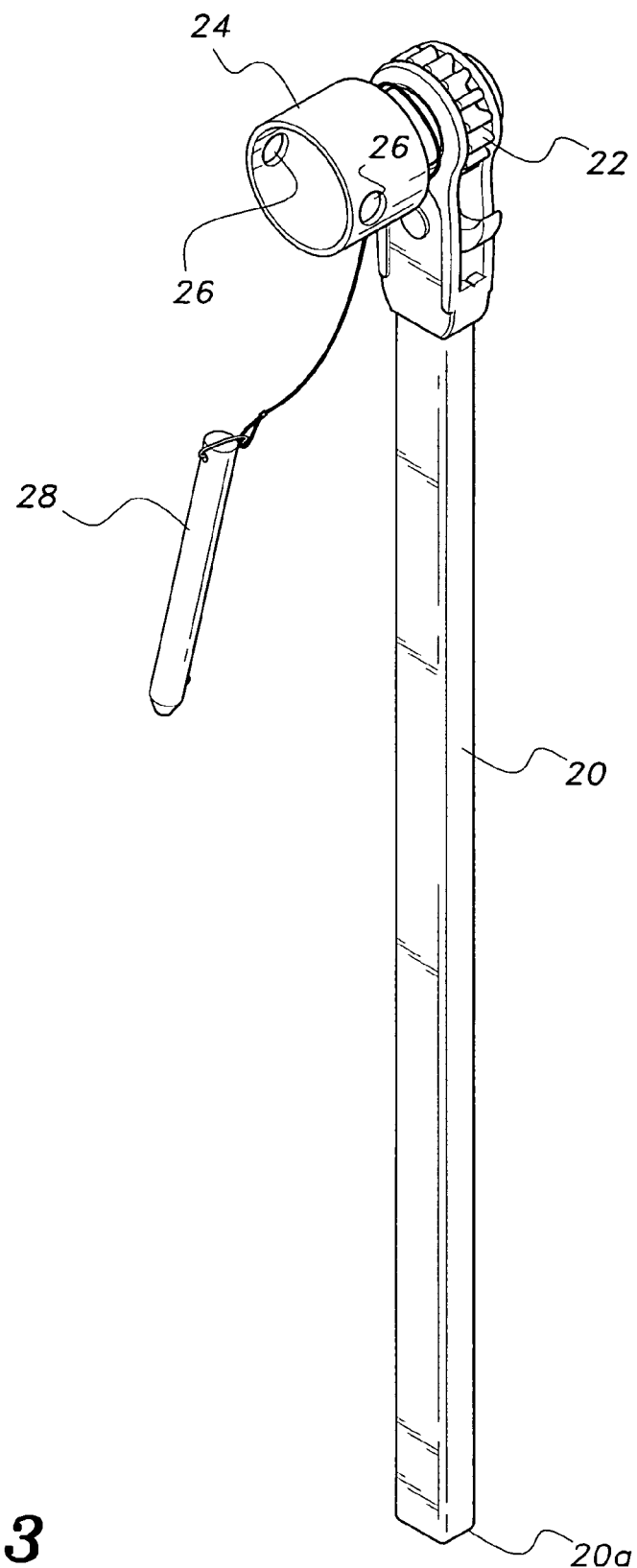
FIG. 3 is a perspective view of a ratcheting winch tool according to the present invention.

As best seen in FIGS. 2 and 3 tool 10 comprises a handle 20 having a proximate end and a distal end 20a. Distal end 20a is a free end. The proximate end is terminates in a ratchet mechanism 22. Handle 20 is fabricated from standard ¾" metal stock. Although the handle may be made to any convenient length, it has been found that a handle length of about 27" is most suitable. A cylindrical socket 24 extends from one side of ratchet mechanism 22. Socket 24 is defined by a cylindrical wall having an open end and having diametrically positioned openings 26 formed therethrough. Cylindrical socket 24 is adapted to encompass the drive shaft 12a of winch 12. Drive shaft 12a has plural openings spaced therearound which arrangement is conventional in the art. It is again noted that the winch and drive shaft are conventional and are not, per se, part of the inventive concept. A lock pin 28 is utilized to secure socket 24 to drive shaft 12a by aligning openings 26 with a pair of corresponding openings in drive shaft 12a and inserting lock pin 28 therethrough. When the socket has been secured to the drive shaft, simple back and forth motion of handle 20 will function to tighten the belt 14. When one belt has been tightened, the lock pin is removed and the procedure is repeated to tighten the next belt.

Now, in the event the conventional winch drive 12 is not cylindrical, as shown in the several drawing figures, then the socket 24 would be shaped to accommodate the configuration of the winch drive. For example, the winch drive could be square, hexagonal or otherwise externally configured. In such instances, the cylindrical socket 24 would be at least internally configured and sized to match the winch drive shaft.

It is to be understood that the present invention is not limited to the embodiment described above, but encompasses any and all embodiments within the scope of the following claims.

I claim:

1. A ratcheting winch tool, comprising:
    an elongate handle, said handle having a proximate end and a distal end, wherein said distal end is a free end;
    a ratchet mechanism, said ratchet mechanism disposed at said proximate end of said handle;
    a socket attached to said ratchet mechanism and extending therefrom;
    a cylindrical wall defining said socket, said cylindrical wall having an open end; and
    a pair of openings disposed through said cylindrical wall.

2. The ratcheting winch tool according to claim 1, wherein said handle, said ratchet and said socket are fabricated from metallic material.

3. The ratcheting winch tool according to claim 1, wherein said pair of openings is diametrically spaced around said cylindrical wall.

4. The ratcheting winch tool according to claim 1, wherein said handle has a length and said length is substantially 27 inches.

5. A ratcheting winch tool, comprising:
    an elongate handle, said handle having a proximate end and a distal end, wherein said distal end is a free end;
    a ratchet mechanism, said ratchet mechanism disposed at said proximate end of said handle;

a socket attached to said ratchet mechanism and extending therefrom;

a cylindrical wall defining said socket, said cylindrical wall having an open end;

a pair of openings disposed through said cylindrical wall; and a locking pin, said locking pin adapted for insertion through said pair of openings.

6. The ratcheting winch tool according to claim 5, wherein said handle, said ratchet and said socket are fabricated from metallic material.

7. The ratcheting winch tool according to claim 5, wherein said pair of openings are diametrically spaced around said cylindrical wall.

8. The ratcheting winch tool according to claim 5, wherein said handle has a length and said length is about 27 inches.

9. A ratcheting winch tool, comprising:

an elongate handle, said handle having a length of about 27 inches, a proximate end and a distal end, wherein said distal end is a free end;

a ratchet mechanism, said ratchet mechanism disposed at said proximate end of said handle;

a socket attached to said ratchet mechanism and extending therefrom;

a wall defining said socket, said wall having an open end;

a pair of openings disposed through and diametrically spaced around said wall; and a locking pin, said locking pin adapted for insertion through said pair of opening.

10. The ratcheting winch tool according to claim 9, wherein said handle, said ratchet and said socket are fabricated from metallic material.

11. The ratcheting winch tool according to claim 9, wherein said socket wall is cylindrical in configuration.

12. The ratcheting winch tool according to claim 9, wherein said socket wall is configured at least internally to match the external configuration of a winch drive shaft with which the socket wall is to be employed.

* * * * *